United States Patent
Pandey et al.

(10) Patent No.: US 9,597,768 B1
(45) Date of Patent: Mar. 21, 2017

(54) SELECTIVE NITRIDE SLURRIES WITH IMPROVED STABILITY AND IMPROVED POLISHING CHARACTERISTICS

(71) Applicant: Cabot Microelectronics Corporation, Aurora, IL (US)

(72) Inventors: Prativa Pandey, Aurora, IL (US); Juyeon Chang, Hwaseong-si (KR); Brian Reiss, Woodridge, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 14/849,066

(22) Filed: Sep. 9, 2015

(51) Int. Cl.
*H01L 21/302* (2006.01)
*H01L 21/461* (2006.01)
*B24B 37/04* (2012.01)
*C09G 1/02* (2006.01)

(52) U.S. Cl.
CPC .............. *B24B 37/044* (2013.01); *C09G 1/02* (2013.01)

(58) Field of Classification Search
CPC ................................................ H01L 21/02065
USPC ............................................ 216/89; 438/693
See application file for complete search history.

(56) References Cited

U.S. PATENT DOCUMENTS

| 2003/0022499 | A1 | 1/2003 | Lee et al. |
| 2006/0096179 | A1 | 5/2006 | Lu et al. |
| 2015/0024595 | A1 | 1/2015 | Dinega et al. |
| 2015/0159046 | A1 | 6/2015 | Dinega et al. |
| 2016/0257856 | A1* | 9/2016 | Reiss ........................ B24B 1/00 |

* cited by examiner

*Primary Examiner* — Roberts Culbert
(74) *Attorney, Agent, or Firm* — Thomas Omholt; Erika Wilson; Francis J. Koszyk

(57) ABSTRACT

The invention provides a chemical-mechanical polishing composition comprising, consisting essentially of, or consisting of (a) about 0.01 wt. % to about 1 wt. % of wet-process ceria, (b) about 10 ppm to about 200 ppm of a cationic polymer comprising quaternary amino groups, (c) about 10 ppm to about 2000 ppm of a non-fluorinated nonionic surfactant, (d) an amino acid, and (e) water, wherein the polishing composition has a pH of about 3 to about 8. The invention further provides a method of polishing a substrate with the polishing composition.

23 Claims, No Drawings

SELECTIVE NITRIDE SLURRIES WITH IMPROVED STABILITY AND IMPROVED POLISHING CHARACTERISTICS

BACKGROUND OF THE INVENTION

Compositions and methods for planarizing or polishing the surface of a substrate are well known in the art. Polishing compositions (also known as polishing slurries) typically contain an abrasive material in a liquid carrier and are applied to a surface by contacting the surface with a polishing pad saturated with the polishing composition. Typical abrasive materials include silicon dioxide, cerium oxide, aluminum oxide, zirconium oxide, and tin oxide. Polishing compositions are typically used in conjunction with polishing pads (e.g., a polishing cloth or disk). Instead of, or in addition to, being suspended in the polishing composition, the abrasive material may be incorporated into the polishing pad.

As a method for isolating elements of a semiconductor device, a great deal of attention is being directed towards a shallow trench isolation (STI) process where a silicon nitride layer is formed on a silicon substrate, shallow trenches are formed via etching or photolithography, and a dielectric layer (e.g., an oxide) is deposited to fill the trenches. Due to variation in the depth of trenches, or lines, formed in this manner, it is typically necessary to deposit an excess of dielectric material on top of the substrate to ensure complete filling of all trenches. The excess dielectric material is then typically removed by a chemical-mechanical planarization process to expose the silicon nitride layer. When the silicon nitride layer is exposed, the largest area of the substrate exposed to the chemical-mechanical polishing composition comprises silicon nitride, which must then be polished to achieve a highly planar and uniform surface.

Generally, past practice has been to emphasize selectivity for oxide polishing in preference to silicon nitride polishing. Thus, the silicon nitride layer has served as a stopping layer during the chemical-mechanical planarization process, as the overall polishing rate decreased upon exposure of the silicon nitride layer. Removal of the silicon nitride layer requires selectivity for silicon nitride polishing in preference to oxide polishing The STI substrate is typically polished using a conventional polishing medium and an abrasive-containing polishing composition. However, polishing STI substrates with conventional polishing media and abrasive-containing polishing compositions has been observed to result in overpolishing of the substrate surface or the formation of recesses in the STI features and other topographical defects such as microscratches on the substrate surface. This phenomenon of overpolishing and forming recesses in the STI features is referred to as dishing. Dishing is undesirable because dishing of substrate features may detrimentally affect device fabrication by causing failure of isolation of transistors and transistor components from one another, thereby resulting in short-circuits. Additionally, overpolishing of the substrate may also result in oxide loss and exposure of the underlying oxide to damage from polishing or chemical activity, which detrimentally affects device quality and performance.

In addition, a number of existing polishing compositions, particularly containing ceria abrasives, exhibit a limited ability to be concentrated due to instability of the polishing compositions above a certain concentration, leading to settling out of abrasive components. The instability of concentrated polishing compositions thus requires production of more diluted polishing compositions, which increases the volume of material that must be shipped and stored.

Thus, there remains a need in the art for polishing compositions and methods that can provide desirable selectivity of silicon oxide, silicon nitride, and polysilicon and that have suitable removal rates, low defectivity, and suitable dishing performance, while further exhibiting enhanced dispersion stability.

BRIEF SUMMARY OF THE INVENTION

The invention provides a chemical-mechanical polishing composition comprising (a) about 0.01 wt. % to about 1 wt. % of wet-process ceria, (b) about 10 ppm to about 200 ppm of a cationic polymer comprising quaternary amino groups, (c) about 10 ppm to about 2000 ppm of a non-fluorinated nonionic surfactant, (d) an amino acid, and (e) water, wherein the polishing composition has a pH of about 3 to about 8.

The invention also provides a method of chemically-mechanically polishing a substrate comprising (i) contacting a substrate with a polishing pad and a chemical-mechanical polishing composition comprising (a) about 0.01 wt. % to about 1 wt. % of wet-process ceria, (b) about 10 ppm to about 200 ppm of a cationic polymer comprising quaternary amino groups, (c) about 10 ppm to about 2000 ppm of a non-fluorinated nonionic surfactant, (d) an amino acid, and (e) water, wherein the polishing composition has a pH of about 3 to about 8, (ii) moving the polishing pad and the chemical-mechanical polishing composition relative to the substrate, and (iii) abrading at least a portion of the substrate to polish the substrate.

DETAILED DESCRIPTION OF THE INVENTION

The invention provides a chemical-mechanical polishing composition comprising, consisting essentially of, or consisting of (a) about 0.01 wt. % to about 1 wt. % of wet-process ceria, (b) about 10 ppm to about 200 ppm of a cationic polymer comprising quaternary amino groups, (c) about 10 ppm to about 2000 ppm of a non-fluorinated nonionic surfactant, (d) an amino acid, and (e) water, wherein the polishing composition has a pH of about 3 to about 8.

The chemical-mechanical polishing composition comprises a ceria abrasive. As is well known, ceria is an oxide of the rare earth metal cerium, and is also known as ceric oxide, cerium oxide (e.g., cerium(IV) oxide), or cerium dioxide. Cerium(IV) oxide ($CeO_2$) can be formed by calcining cerium oxalate or cerium hydroxide. Cerium also forms cerium(III) oxides such as, for example, $Ce_2O_3$. The ceria abrasive can be any one or more of these or other oxides of ceria.

The ceria abrasive can be of any suitable type. As used herein, "wet-process" ceria refers to a ceria prepared by a precipitation, condensation-polymerization, or similar process (as opposed to, for example, fumed or pyrogenic ceria). A polishing composition of the invention comprising a wet-process ceria abrasive has been typically found to exhibit lower defects when used to polish substrates according to a method of the invention. Without wishing to be bound to a particular theory, it is believed that wet-process ceria comprises spherical ceria particles and/or smaller aggregate ceria particles, thereby resulting in lower substrate defectivity when used in the inventive method. An illustrative wet-process ceria is HC60™ ceria commercially available from Rhodia.

The ceria particles can have any suitable average size (i.e., average particle diameter). If the average ceria particle size is too small, the polishing composition may not exhibit sufficient removal rate. In contrast, if the average ceria particle size is too large, the polishing composition may exhibit undesirable polishing performance such as, for example, poor substrate defectivity. Accordingly, the ceria particles can have an average particle size of about 10 nm or more, for example, about 15 nm or more, about 20 nm or more, about 25 nm or more, about 30 nm or more, about 35 nm or more, about 40 nm or more, about 45 nm or more, or about 50 nm or more. Alternatively, or in addition, the ceria can have an average particle size of about 1,000 nm or less, for example, about 750 nm or less, about 500 nm or less, about 250 nm or less, about 150 nm or less, about 100 nm or less, about 75 nm or less, or about 50 nm or less. Thus, the ceria can have an average particle size bounded by any two of the aforementioned endpoints. For example, the ceria can have an average particle size of about 10 nm to about 1,000 nm, about 10 nm to about 750 nm, about 15 nm to about 500 nm, about 20 nm to about 250 nm, about 20 nm to about 150 nm, about 25 nm to about 150 nm, about 25 nm to about 100 nm, or about 50 nm to about 150 nm, or about 50 nm to about 100 nm. For spherical ceria particles, the size of the particle is the diameter of the particle. For non-spherical ceria particles, the size of the particle is the diameter of the smallest sphere that encompasses the particle. The particle size of the ceria can be measured using any suitable technique, for example, using laser diffraction techniques. Suitable particle size measurement instruments are available from, for example, Malvern Instruments (Malvern, UK).

In some embodiments, the ceria abrasive of the polishing composition exhibits a multimodal particle size distribution. As used herein, the term "multimodal" means that the ceria abrasive exhibits an average particle size distribution having at least 2 maxima (e.g., 2 or more maxima, 3 or more maxima, 4 or more maxima, or 5 or more maxima). Preferably, in these embodiments, the ceria abrasive exhibits a bimodal particle size distribution, i.e., the ceria abrasive exhibits a particle size distribution having 2 average particle size maxima. The terms "maximum" and "maxima" mean a peak or peaks in the particle size distribution. The peak or peaks correspond to the average particle sizes described herein for the ceria abrasive particles. Thus, for example, a plot of the number of particles versus particle size will reflect a bimodal particle size distribution, with a first peak in the particle size range of about 75 nm to about 150 nm, for example, about 80 nm to about 140 nm, about 85 nm to about 130 nm, or about 90 nm to about 120 nm, and a second peak in the particle size range of about 25 nm to about 70 nm, for example, about 30 nm to about 65 nm, about 35 nm to about 65 nm, or about 40 nm to about 60 nm. The ceria abrasive having a multimodal particle size distribution can be obtained by combining two different ceria abrasives each having a monomodal particle size distribution.

The ceria particles preferably are colloidally stable in the inventive polishing composition. The term colloid refers to the suspension of ceria particles in the liquid carrier (e.g., water). Colloidal stability refers to the maintenance of that suspension through time. In the context of this invention, an abrasive is considered colloidally stable if, when the abrasive is placed into a 100 mL graduated cylinder and allowed to stand unagitated for a time of 2 hours, the difference between the concentration of particles in the bottom 50 mL of the graduated cylinder ([B] in terms of g/mL) and the concentration of particles in the top 50 mL of the graduated cylinder ([T] in terms of g/mL) divided by the initial concentration of particles in the abrasive composition ([C] in terms of g/mL) is less than or equal to 0.5 (i.e., {[B]−[T]}/[C]≤0.5). More preferably, the value of [B]−[T]/[C] is less than or equal to 0.3, and most preferably is less than or equal to 0.1.

The polishing composition can comprise any suitable amount of ceria abrasive. If the polishing composition of the invention comprises too little ceria abrasive, the composition may not exhibit a sufficient removal rate. In contrast, if the polishing composition comprises too much ceria abrasive, then the polishing composition may exhibit undesirable polishing performance and/or may not be cost effective and/or may lack stability. The polishing composition can comprise about 10 wt. % or less of ceria, for example, about 9 wt. % or less, about 8 wt. % or less, about 7 wt. % or less, about 6 wt. % or less, about 5 wt. % or less, about 4 wt. % or less, about 3 wt. % or less, about 2 wt. % or less, about 1 wt. % or less, about 0.9 wt. % or less, about 0.8 wt. % or less, about 0.7 wt. % or less, about 0.6 wt. % or less of ceria, or about 0.5 wt. % or less of ceria. Alternatively, or in addition, the polishing composition can comprise about 0.05 wt. % or more of ceria, for example, about 0.1 wt. % or more, about 0.2 wt. % or more, about 0.3 wt. % or more, about 0.4 wt. % or more, about 0.5 wt. % or more, or about 1 wt. % or more. Thus, the polishing composition can comprise ceria in an amount bounded by any two of the aforementioned endpoints. For example, the polishing composition can comprise about 0.05 wt. % to about 10 wt. % of ceria, for example, 0.1 wt. % to about 10 wt. %, about 0.1 wt. % to about 9 wt. %, about 0.1 wt. % to about 8 wt. %, about 0.1 wt. % to about 7 wt. %, about 0.1 wt. % to about 6 wt. %, about 0.1 wt. % to about 5 wt. % of ceria, about 0.1 wt. % to about 4 wt. %, about 0.1 wt. % to about 3 wt. % of ceria, about 0.1 wt. % to about 2 wt. % of ceria, about 0.1 wt. % to about 1 wt. % of ceria, about 0.2 wt. % to about 2 wt. % of ceria, about 0.2 wt. % to about 1 wt. % of ceria, about 0.2 wt. % to about 0.6 wt. % of ceria, or about 0.3 wt. % to about 0.5 wt. % of ceria. In an embodiment, the polishing composition comprises, at point-of-use, about 0.2 wt. % to about 0.6 wt. % of ceria (e.g., about 0.4 wt. % of ceria). In another embodiment, the polishing composition comprises, as a concentrate, about 1-2 wt. % (e.g., about 1.2 wt. % or about 1.6 wt. %) of ceria.

The polishing composition comprises one or more cationic polymers or copolymers comprising quaternary ammonium groups. The cationic polymer or copolymer can be any suitable cationic polymer or copolymer. Non-limiting examples of suitable cationic polymers or copolymers include cationic polymers or copolymers comprising diallyldimethylammonium monomer units, methacryloxyethyltrimethylammonium monomer units, N,N-dimethyl-2-hydroxypropylammonium monomer units, (3-methyl-1-vinylimidazolium chloride) units, quaternized [bis(2-chloroethyl) ether-alt-1,3-bis[3-(dimethylamino)propyl]urea] units, quaternized anhydroglucose units, or a combination thereof. When the cationic polymer or copolymer comprises quaternized anhydroglucose unit, the cationic polymer or copolymer can be a material known as a quaternized cellulose. It will be understood that the cationic polymer or copolymer typically contains two or more quaternary ammonium groups as the cationic polymer or copolymer comprises two or more monomer units bearing quaternary ammonium groups.

In an embodiment, the polishing composition comprises cationic polymers or copolymers comprising diallyldimethylammonium monomer units. In other embodiments, the polishing composition comprises cationic polymers or copolymers comprising diallyldimethylammonium monomer units in combination with cationic polymers or copolymers comprising methacryloxyethyltrimethylammonium monomer units, N,N-dimethyl-2-hydroxypropylammonium monomer units, (3-methyl-1-vinylimidazolium chloride) units, quaternized [bis(2-chloroethyl) ether-alt-1,3-bis[3-(dimethylamino)propyl]urea] units, quaternized anhydroglucose units. In another embodiment, the polishing composition comprises cationic polymers or copolymers comprising methacryloxyethyltrimethylammonium monomer units, N,N-dimethyl-2-hydroxypropylammonium monomer units, (3-methyl-1-vinylimidazolium chloride) units, quaternized [bis(2-chloroethyl) ether-alt-1,3-bis[3-(dimethylamino)propyl]urea] units, quaternized anhydroglucose units.

The cationic polymer or copolymer can have any suitable molecular weight. The cationic polymer or copolymer can have an average molecular weight of about 250 g/mol or more, for example, about 300 g/mol or more, about 400 g/mol or more, about 500 g/mol or more, about 600 g/mol or more, about 750 g/mol or more, about 1,000 g/mol or more, about 1,500 g/mol or more, about 2,000 g/mol or more, about 2,500 g/mol or more, about 3,000 g/mol or more, about 3,500 g/mol or more, about 4,000 g/mol or more, about 4,500 g/mol or more, about 5,000 g/mol or more, about 5,500 g/mol or more, about 6,000 g/mol or more, about 6,500 g/mol or more, about 7,000 g/mol or more, or about 7,500 g/mol or more. Alternatively, or in addition, the cationic polymer or copolymer can have an average molecular weight of about 50,000 g/mol or less, for example, about 45,000 g/mol or less, about 40,000 g/mol or less, about 35,000 g/mol or less, about 30,000 g/mol or less, about 25,000 g/mol or less, about 20,000 g/mol or less, about 15,000 g/mol or less, or about 10,000 g/mol or less. Thus, the cationic polymer or copolymer can have an average molecular weight bounded by any two of the aforementioned endpoints. For example, the cationic polymer or copolymer can have an average molecular weight of about 250 g/mol to about 50,000 g/mol, about 250 g/mol to about 45,000 g/mol, about 250 g/mol to about 40,000 g/mol, about 250 g/mol to about 35,000 g/mol, about 1,000 g/mol to about 30,000 g/mol, about 1,000 g/mol to about 25,000 g/mol, about 1,000 g/mol to about 20,000 g/mol, about 2,000 g/mol to about 15,000 g/mol, about 3,000 g/mol to about 10,000 g/mol, about 7,500 g/mol to about 50,000 g/mol, about 7,500 g/mol to about 40,000 g/mol, about 7,500 g/mol to about 35,000 g/mol.

The polishing composition comprises any suitable amount of the cationic polymer or copolymer at the point-of-use. The amount of cationic polymer or copolymer refers the the total amount of cationic polymers or copolymers present in the polishing composition. The polishing composition can comprise about 1 ppm or more of the cationic polymer or copolymer, for example, about 5 ppm or more, about 10 ppm or more, about 20 ppm or more, about 30 ppm or more, about 40 ppm or more, or about 50 ppm or more. Alternatively, or in addition, the polishing composition can comprise about 1000 ppm or less of the cationic polymer or copolymer, for example, about 900 ppm or less, about 800 ppm or less, about 700 ppm or less, about 600 ppm or less, about 500 ppm or less, about 400 ppm or less, about 300 ppm or less, or about 200 ppm or less. Thus, the polishing composition can comprise the cationic polymer or copolymer in an amount bounded by any two of the aforementioned endpoints. For example, the polishing composition can comprise about 1 ppm to about 1000 ppm of the cationic polymer or copolymer, about 10 ppm to about 900 ppm, about 10 ppm to about 800 ppm, about 10 ppm to about 700 ppm, about 10 ppm to about 600 ppm, about 10 ppm to about 500 ppm, about 10 ppm to about 400 ppm, about 20 ppm to about 300 ppm, about 30 ppm to about 200 ppm, about 30 ppm to about 150 ppm, about 30 ppm to about 100 ppm, or about 30 ppm to about 750 ppm.

The polishing composition comprises a non-fluorinated nonionic surfactant. The non-fluorinated nonionic surfactant can be any suitable non-fluorinated nonionic surfactant. In accordance with an embodiment of the invention, the polishing composition comprises one or more non-fluorinated nonionic surfactants selected from the group consisting of polyalkylene glycols, polyetheramines, polyethylene oxide/polypropylene oxide copolymers, polyethylene glycol alkyl ether, polyacrylamide, polyvinylpyrrolidone, siloxane polyalkyleneoxide copolymers, hydrophobically modified polyacrylate copolymers, hydrophilic nonionic polymers, polysaccharides, and mixtures thereof. The non-fluorinated nonionic surfactant is preferably water-soluble and compatible with other components of the polishing composition.

The non-fluorinated nonionic surfactant can have any suitable molecular weight. The non-fluorinated nonionic surfactant can have an average molecular weight of about 500 g/mol or more, for example, about 600 g/mol or more, about 750 g/mol or more, about 1,000 g/mol or more, about 1,500 g/mol or more, or about 2,000 g/mol or more. Alternatively, or in addition, the non-fluorinated nonionic surfactant can have an average molecular weight of about 10,000 g/mol or less, for example, about 9,000 g/mol or less, about 8,000 g/mol or less, about 7,500 g/mol or less, about 7,000 g/mol or less, about 6,500 g/mol or less, about 6,000 g/mol or less, about 5,500 g/mol or less, or about 5,000 g/mol or less. Thus, the non-fluorinated nonionic surfactant can have an average molecular weight bounded by any two of the aforementioned endpoints. For example, the non-fluorinated nonionic surfactant can have an average molecular weight of about 500 g/mol to about 10,000 g/mol, about 500 g/mol to about 9,000 g/mol, about 500 g/mol to about 8,000 g/mol, about 500 g/mol to about 7,000 g/mol, about 500 g/mol to about 6,000 g/mol, about 500 g/mol to about 5,000 g/mol, about 1000 g/mol to about 10,000 g/mol, about 1000 g/mol to about 9,000 g/mol, about 1000 g/mol to about 8,000 g/mol, about 1000 g/mol to about 7,000 g/mol, about 1000 g/mol to about 6,000 g/mol, or about 1000 g/mol to about 5,000 g/mol.

The polishing composition optionally further comprises a fluorinated nonionic surfactant. The fluorinated nonionic surfactant can be any suitable fluorinated nonionic surfactant. In embodiments, the fluorinated nonionic surfactant can comprise a polymer of formula I:

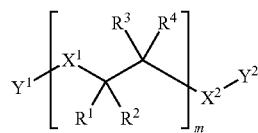

wherein $X^1$ and $X^2$ are independently selected from O, C, and S, $Y^1$ and $Y^2$ are independently selected from OH, $C_1$-$C_{10}$ alkyl, and a group of the formula $C_xH_yF_z$, $R^1$, $R^2$, $R^3$, and $R^4$ are independently selected from hydrogen, F, $C_1$-$C_{10}$ alkyl, $C_6$-$C_{10}$ aryl, and heteroaromatic, x is an integer of 1 to about 20, z is an integer of 1 to about 41, m is an integer of about 3 to about 500, and at least one of $Y^1$ or $Y^2$ is $C_xH_yF_z$ or at least one of $R^1$-$R^4$ is F.

In certain embodiments, the fluorinated nonionic surfactant is a polymer of formula I wherein at least one of $Y^1$ or $Y^2$ is $C_xH_yF_z$. In certain embodiments, the polymer is of formula I wherein both of $Y^1$ and $Y^2$ are $C_xH_yF_z$. In certain embodiments, x is an integer of 1 to 9. In certain embodiments, x is an integer of 1 to 8, and y is an integer of 1 to 40. As will be understood by a person of ordinary skill in the art, in the group of the formula $C_xH_yF_z$, y+z=2x+1, such that specifying any two of x, y, and z allows for calculation of the third variable. In certain preferred embodiments, the polymer is of formula I wherein each of $X^1$ and $X^2$ is O. In certain embodiments, each of $R^1$, $R^2$, $R^3$, and $R^4$ is independently hydrogen or F. In certain of these embodiments, at least one of $R^1$, $R^2$, $R^3$, and $R^4$ is F, and $Y^1$ and $Y^2$ can be any of the groups described herein for $Y^1$ and $Y^2$. Non-limiting examples of suitable polymers of formula I include members of the CAPSTONE™ series of polymers supplied by DuPont, for example, CAPSTONE™ FS-30, CAPSTONE™ FS-31, CAPSTONE™ FS-34, CAPSTONE™ FS-35, CAPSTONE™ FS-65, CAPSTONE™ FS-81, CAPSTONE™ FS-3100, and CAPSTONE™ ST-100HS.

The fluorinated nonionic surfactant can have any suitable molecular weight. The fluorinated nonionic surfactant can have an average molecular weight of about 500 g/mol or more, for example, about 600 g/mol or more, about 750 g/mol or more, about 1,000 g/mol or more, about 1,500 g/mol or more, about 2,000 g/mol or more, about 2,500 g/mol or more, about 3,000 g/mol or more, about 3,500 g/mol or more, about 4,000 g/mol or more, about 4,500 g/mol or more, about 5,000 g/mol or more, about 5,500 g/mol or more, about 6,000 g/mol or more, about 6,500 g/mol or more, about 7,000 g/mol or more, or about 7,500 g/mol or more. Alternatively, or in addition, the fluorinated nonionic surfactant can have an average molecular weight of about 10,000 g/mol or less, for example, about 9,000 g/mol or less, about 8,000 g/mol or less, about 7,500 g/mol or less, about 7,000 g/mol or less, about 6,500 g/mol or less, about 6,000 g/mol or less, about 5,500 g/mol or less, about 5,000 g/mol or less, about 4,500 g/mol or less, about 4,000 g/mol or less, about 3,500 g/mol or less, about 3,000 g/mol or less, about 2,500 g/mol or less, or about 2,000 g/mol or less. Thus, the fluorinated nonionic surfactant can have an average molecular weight bounded by any two of the aforementioned endpoints. For example, the fluorinated nonionic surfactant can have an average molecular weight of about 500 g/mol to about 10,000 g/mol, about 500 g/mol to about 9,000 g/mol, about 500 g/mol to about 8,000 g/mol, about 500 g/mol to about 7,000 g/mol, about 500 g/mol to about 6,000 g/mol, about 500 g/mol to about 5,000 g/mol, about 1000 g/mol to about 10,000 g/mol, about 1000 g/mol to about 9,000 g/mol, about 1000 g/mol to about 8,000 g/mol, about 1000 g/mol to about 7,000 g/mol, about 1000 g/mol to about 6,000 g/mol, or about 1000 g/mol to about 5,000 g/mol.

The polishing composition comprises any suitable amount of the non-fluorinated nonionic surfactant and optional fluorinated nonionic surfactant at the point-of-use. The polishing composition can comprise about 10 ppm or more of the non-fluorinated nonionic surfactant and optional fluorinated nonionic surfactant, for example, about 15 ppm or more, about 20 ppm or more, about 25 ppm or more, about 30 ppm or more, about 35 ppm or more, or about 40 ppm or more. Alternatively, or in addition, the polishing composition can comprise about 1000 ppm or less of the non-fluorinated nonionic surfactant and optional fluorinated nonionic surfactant, for example, about 800 ppm or less, about 600 ppm or less, about 400 ppm or less, about 200 ppm or less, about 100 ppm or less, about 80 ppm or less, about 60 ppm or less, or about 40 ppm or less. Thus, the polishing composition can comprise the non-fluorinated nonionic surfactant and optional fluorinated nonionic surfactant in an amount bounded by any two of the aforementioned endpoints. For example, the polishing composition can comprise about 10 ppm to about 1000 ppm of the non-fluorinated nonionic surfactant and optional fluorinated nonionic surfactant, about 15 ppm to about 800 ppm, about 15 ppm to about 600 ppm, about 15 ppm to about 400 ppm, about 15 ppm to about 200 ppm, about 15 ppm to about 100 ppm, about 15 ppm to about 80 ppm, about 15 ppm to about 60 ppm, or about 15 ppm to about 40 ppm.

The polishing composition comprises one or more amino acids. The amino acid can be any suitable amino acid. Non-limiting examples of suitable amino acids include glycine, valine (e.g., L-valine), and alanine (e.g., L-alanine), or a combination thereof.

The polishing composition can comprise any suitable amount of the amino acid. The polishing composition can comprise about 10 ppm or more of the amino acid, for example, about 20 ppm or more, about 30 ppm or more, about 40 ppm or more, or about 50 ppm or more. Alternatively, or in addition, the polishing composition can comprise about 1000 ppm or less of the amino acid, for example, about 800 ppm or less, about 600 ppm or less, about 400 ppm or less, about 200 ppm or less. Thus, the polishing composition can comprise the amino acid in an amount bounded by any two of the aforementioned endpoints. For example, the polishing composition can comprise about 10 ppm to about 1000 ppm of the amino acid, about 10 ppm to about 800 ppm, about 10 ppm to about 600 ppm, about 10 ppm to about 400 ppm, about 10 ppm to about 200 ppm.

The chemical-mechanical polishing composition optionally comprises one or more polyvinyl alcohols. The polyvinyl alcohol can be any suitable polyvinyl alcohol and can be a linear or branched polyvinyl alcohol. Non-limiting examples of suitable branched polyvinyl alcohols are the Nichigo G-polymers, such as the OKS-1009 and OKS-1083 products, available from Nippon Gohsei, Japan.

The polyvinyl alcohol can have any suitable degree of hydrolysis. The degree of hydrolysis refers to the amount of free hydroxyl groups present on the polyvinyl alcohol as compared with the sum of free hydroxyl groups and acetylated hydroxyl groups. Preferably, the polyvinyl alcohol has a degree of hydrolysis of about 90% or more, e.g., about 92% or more, about 94% or more, about 96% or more, about 98% or more, or about 99% or more.

The polyvinyl alcohol can have any suitable molecular weight. The polyvinyl alcohol can have an average molecular weight of about 250 g/mol or more, for example, about 300 g/mol or more, about 400 g/mol or more, about 500 g/mol or more, about 600 g/mol or more, about 750 g/mol or more, about 1,000 g/mol or more, about 2,000 g/mol or more, about 3,000 g/mol or more, about 4,000 g/mol or more, about 5,000 g/mol or more, about 7,500 g/mol or more, about 10,000 g/mol or more, about 15,000 g/mol or more, about 20,000 g/mol or more, about 25,000 g/mol or more, about 30,000 g/mol or more, about 50,000 g/mol or more, or about 75,000 g/mol or more. Alternatively, or in addition, the polyvinyl alcohol can have an average molecular weight of about 250,000 g/mol or less, for example, about 200,000 g/mol or less, about 180,000 g/mol or less, about 150,000 g/mol or less, about 100,000 g/mol or less, about 90,000 g/mol or less, about 80,000 g/mol or less, about 70,000 g/mol or less, about 60,000 g/mol or less, about 50,000 g/mol or less, about 45,000 g/mol or less, about 40,000 g/mol or less, about 35,000 g/mol or less, about 30,000 g/mol or less, about 25,000 g/mol or less, about 20,000 g/mol or less, about 15,000 g/mol or less, about 12,500 g/mol or less, or about 10,000 g/mol or less. Thus, the polyvinyl alcohol can have an average molecular weight bounded by any two of the aforementioned endpoints. For example, the polyvinyl alcohol can have an average molecular weight of about 250 g/mol to about 250,000 g/mol, 250 g/mol to about 200,000 g/mol, 250 g/mol to about 180,000 g/mol, 250 g/mol to about 150,000 g/mol, 250 g/mol to about 100,000 g/mol, about 250 g/mol to about 70,000 g/mol, about 250 g/mol to about 50,000 g/mol, about 250 g/mol to about 25,000 g/mol, about 250 g/mol to about 10,000 g/mol, about 10,000 g/mol to about 100,000 g/mol, about 10,000 g/mol to about 75,000 g/mol, about 10,000 g/mol to about 50,000 g/mol, about 10,000 g/mol to about 40,000 g/mol, about 50,000 g/mol to about 100,000 g/mol, about 75,000 g/mol to about 100,000 g/mol, about 25,000 g/mol to about 200,000 g/mol, or about 50,000 g/mol to about 180,000 g/mol.

The polishing composition comprises any suitable amount of polyvinyl alcohol at the point-of-use. The polishing composition can comprise about 1 ppm or more of the polyvinyl alcohol, for example, about 5 ppm or more, about 10 ppm or more, about 20 ppm or more, about 30 ppm or more, about 40 ppm or more, or about 50 ppm or more. Alternatively, or in addition, the polishing composition can comprise about 1000 ppm or less of the polyvinyl alcohol, for example, about 800 ppm or less, about 600 ppm or less, about 400 ppm or less, about 300 ppm or less, about 200 ppm or less, or about 100 ppm or less. Thus, the polishing composition can comprise the ionic polymer in an amount bounded by any two of the aforementioned endpoints. For example, the polishing composition can comprise about 1 ppm to about 1000 ppm of the polyvinyl alcohol, about 10 ppm to about 800 ppm, about 10 ppm to about 600 ppm, about 20 ppm to about 400 ppm, about 20 ppm to about 200 ppm, or about 20 ppm to about 100 ppm.

The chemical-mechanical polishing composition can comprise one or more compounds capable of adjusting (i.e., that adjust) the pH of the polishing composition (i.e., pH adjusting compounds). The pH of the polishing composition can be adjusted using any suitable compound capable of adjusting the pH of the polishing composition. The pH adjusting compound desirably is water-soluble and compatible with the other components of the polishing composition. Typically, the chemical-mechanical polishing composition has a pH of about 4 to about 7 at the point-of-use.

The amino acid is believed to act as a buffering agent. In some embodiments, it is desirable that the polishing composition comprise another compound capable of adjusting the pH and which is separately capable of buffering an acidic pH of the polishing composition. Accordingly, in these embodiments, it is desirable that the pH of the polishing composition is less than 7.0 (e.g., 6.5+/−0.5, 6.0+/−0.5, 5.5+/−0.5, 5.0+/−0.5, 4.5+/−0.5, or 4.0+/−0.5). The compound capable of adjusting the pH of the polishing composition typically has at least one ionizable group having a pKa of about 3 to about 7 when measured at 25° C.

The compound capable of adjusting and buffering the pH can be selected from the group consisting of ammonium salts, alkali metal salts, carboxylic acids, alkali metal hydroxides, alkali metal carbonates, alkali metal bicarbonates, borates, and mixtures thereof.

The chemical-mechanical polishing composition optionally further comprises one or more additives. Illustrative additives include conditioners, acids (e.g., sulfonic acids), complexing agents (e.g., anionic polymeric complexing agents), chelating agents, biocides, scale inhibitors, dispersants, etc.

A biocide, when present, can be any suitable biocide and can be present in the polishing composition in any suitable amount. A suitable biocide is an isothiazolinone biocide. The amount of biocide in the polishing composition typically is about 1 to about 50 ppm, preferably about 10 to about 20 ppm.

The polishing composition can be produced by any suitable technique, many of which are known to those skilled in the art. The polishing composition can be prepared in a batch or continuous process. Generally, the polishing composition is prepared by combining the components of the polishing composition. The term "component" as used herein includes individual ingredients (e.g., ceria abrasive, cationic polymer comprising quaternary amino groups, non-fluorinated nonionic surfactant, optional fluorinated nonionic surfactant, optional polyvinyl alcohol, amino acid, optional pH adjustor, and/or any optional additive) as well as any combination of ingredients (e.g., ceria abrasive, cationic polymer comprising quaternary amino groups, non-fluorinated nonionic surfactant, optional fluorinated nonionic surfactant, optional polyvinyl alcohol, amino acid, optional pH adjustor, etc.).

For example, the polishing composition can be prepared by (i) providing all or a portion of the liquid carrier, (ii) dispersing the ceria abrasive, cationic polymer comprising quaternary amino groups, non-fluorinated nonionic surfactant, optional fluorinated nonionic surfactant, optional polyvinyl alcohol, amino acid, optional pH adjustor, and/or any optional additive, using any suitable means for preparing such a dispersion, (iii) adjusting the pH of the dispersion as appropriate, and (iv) optionally adding suitable amounts of any other optional components and/or additives to the mixture.

Alternatively, the polishing composition can be prepared by (i) providing one or more components (e.g., liquid carrier, cationic polymer comprising quaternary amino groups, non-fluorinated nonionic surfactant, optional fluorinated nonionic surfactant, optional polyvinyl alcohol, amino acid, optional pH adjustor, and/or any optional additive) in a cerium oxide slurry, (ii) providing one or more components in an additive solution (e.g., liquid carrier, cationic polymer comprising quaternary amino groups, non-fluorinated nonionic surfactant, optional fluorinated nonionic surfactant, optional polyvinyl alcohol, amino acid, optional pH adjustor, and/or any optional additive), (iii) combining the cerium oxide slurry and the additive solution to form a mixture, (iv) optionally adding suitable amounts of any other optional additives to the mixture, and (v) adjusting the pH of the mixture as appropriate.

The polishing composition can be supplied as a one-package system comprising a ceria abrasive, cationic polymer comprising quaternary amino groups, non-fluorinated nonionic surfactant, optional fluorinated nonionic surfactant, optional polyvinyl alcohol, amino acid, optional pH adjustor, and/or any optional additive, and water. Alternatively, the polishing composition of the invention is supplied as a two-package system comprising a cerium oxide slurry in a first package and an additive solution in a second package, wherein the ceria oxide slurry consists essentially of, or consists of, a ceria abrasive, cationic polymer comprising quaternary amino groups, amino acid, optional pH adjustor, and/or any optional additive, and water, and wherein the additive solution consists essentially of, or consists of, non-fluorinated nonionic surfactant, optional fluorinated nonionic surfactant, optional polyvinyl alcohol, and/or any optional additive. The two-package system allows for the adjustment of substrate global flattening characteristics and polishing speed by changing the blending ratio of the two packages, i.e., the cerium oxide slurry and the additive solution.

Various methods can be employed to utilize such a two-package polishing system. For example, the cerium oxide slurry and additive solution can be delivered to the polishing table by different pipes that are joined and connected at the outlet of supply piping. The cerium oxide slurry and additive solution can be mixed shortly or immediately before polishing, or can be supplied simultaneously on the polishing table. Furthermore, when mixing the two packages, deionized water can be added, as desired, to adjust the polishing composition and resulting substrate polishing characteristics.

Similarly, a three-, four-, or more package system can be utilized in connection with the invention, wherein each of multiple containers contains different components of the inventive chemical-mechanical polishing composition, one or more optional components, and/or one or more of the same components in different concentrations.

In order to mix components contained in two or more storage devices to produce the polishing composition at or near the point-of-use, the storage devices typically are provided with one or more flow lines leading from each storage device to the point-of-use of the polishing composition (e.g., the platen, the polishing pad, or the substrate surface). As utilized herein, the term "point-of-use" refers to the point at which the polishing composition is applied to the substrate surface (e.g., the polishing pad or the substrate surface itself). By the term "flow line" is meant a path of flow from an individual storage container to the point-of-use of the component stored therein. The flow lines can each lead directly to the point-of-use, or two or more of the flow lines can be combined at any point into a single flow line that leads to the point-of-use. Furthermore, any of the flow lines (e.g., the individual flow lines or a combined flow line) can first lead to one or more other devices (e.g., pumping device, measuring device, mixing device, etc.) prior to reaching the point-of-use of the component(s).

The components of the polishing composition can be delivered to the point-of-use independently (e.g., the components are delivered to the substrate surface whereupon the components are mixed during the polishing process), or one or more of the components can be combined before delivery to the point-of-use, e.g., shortly or immediately before delivery to the point-of-use. Components are combined "immediately before delivery to the point-of-use" if the components are combined about 5 minutes or less prior to being added in mixed form onto the platen, for example, about 4 minutes or less, about 3 minutes or less, about 2 minutes or less, about 1 minute or less, about 45 s or less, about 30 s or less, about 10 s or less prior to being added in mixed form onto the platen, or simultaneously to the delivery of the components at the point-of-use (e.g., the components are combined at a dispenser). Components also are combined "immediately before delivery to the point-of-use" if the components are combined within 5 m of the point-of-use, such as within 1 m of the point-of-use or even within 10 cm of the point-of-use (e.g., within 1 cm of the point-of-use).

When two or more of the components of the polishing composition are combined prior to reaching the point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternatively, the mixing device can be a container-type mixing device comprising one or more inlets by which two or more components of the polishing slurry are introduced to the mixer, and at least one outlet through which the mixed components exit the mixer to be delivered to the point-of-use, either directly or via other elements of the apparatus (e.g., via one or more flow lines). Furthermore, the mixing device can comprise more than one chamber, each chamber having at least one inlet and at least one outlet, wherein two or more components are combined in each chamber. If a container-type mixing device is used, the mixing device preferably comprises a mixing mechanism to further facilitate the combination of the components. Mixing mechanisms are generally known in the art and include stirrers, blenders, agitators, paddled baffles, gas sparger systems, vibrators, etc.

The polishing composition also can be provided as a concentrate which is intended to be diluted with an appropriate amount of water prior to use. In such an embodiment, the polishing composition concentrate comprises the components of the polishing composition in amounts such that, upon dilution of the concentrate with an appropriate amount of water, each component of the polishing composition will be present in the polishing composition in an amount within the appropriate range recited above for each component. For example, the ceria abrasive, cationic polymer comprising quaternary amino groups, non-fluorinated nonionic surfactant, optional fluorinated nonionic surfactant, optional polyvinyl alcohol, amino acid, optional pH adjustor, and/or any optional additive can each be present in the concentrate in an amount that is about 2 times (e.g., about 3 times, about 4 times, or about 5 times) greater than the concentration recited above for each component so that, when the concentrate is diluted with an equal volume of water (e.g., 2 equal volumes water, 3 equal volumes of water, or 4 equal volumes of water, respectively), each component will be present in the polishing composition in an amount within the ranges set forth above for each component. Furthermore, as will be understood by those of ordinary skill in the art, the concentrate can contain an appropriate fraction of the water present in the final polishing composition in order to ensure that the cationic polymer comprising quaternary amino groups, non-fluorinated nonionic surfactant, optional fluorinated nonionic surfactant, optional polyvinyl alcohol, amino acid, optional pH adjustor, and/or any optional additive are at least partially or fully dissolved in the concentrate. Desirably, the inventive polishing composition is colloidally stable when in the form of a concentrate that is 4 times more concentrated than the polishing composition at the point-of-use.

The invention also provides a method of chemically-mechanically polishing a substrate comprising (i) contacting a substrate with a polishing pad and the chemical-mechanical polishing composition as described herein, (ii) moving the polishing pad relative to the substrate with the chemical-mechanical polishing composition therebetween, and (iii) abrading at least a portion of the substrate to polish the substrate.

The chemical-mechanical polishing composition can be used to polish any suitable substrate and is especially useful for polishing substrates comprising at least one layer (typically a surface layer) comprised of a low dielectric material. Suitable substrates include wafers used in the semiconductor industry. The wafers typically comprise or consist of, for example, a metal, metal oxide, metal nitride, metal composite, metal alloy, a low dielectric material, or combinations thereof. The method of the invention is particularly useful for polishing substrates comprising silicon oxide, silicon nitride, and/or polysilicon, e.g., any one, two, or especially all three of the aforementioned materials.

In certain embodiments, the substrate comprises polysilicon in combination with silicon oxide and/or silicon nitride. The polysilicon can be any suitable polysilicon, many of which are known in the art. The polysilicon can have any suitable phase and can be amorphous, crystalline, or a combination thereof. The silicon oxide similarly can be any suitable silicon oxide, many of which are known in the art. Suitable types of silicon oxide include, but are not limited to, borophosphosilicate glass (BPSG), PETEOS, thermal oxide, undoped silicate glass, and HDP oxide.

The chemical-mechanical polishing composition of the invention desirably exhibits a high removal rate when polishing a substrate comprising silicon nitride according to a method of the invention. For example, when polishing silicon wafers comprising silicon nitride in accordance with an embodiment of the invention, the polishing composition desirably exhibits a silicon nitride removal rate of about 500 Å/min or higher, 700 Å/min or higher, about 1,000 Å/min or higher, about 1,250 Å/min or higher, about 1,500 Å/min or higher, about 1,750 Å/min or higher, or about 2,000 Å/min or higher.

The chemical-mechanical polishing composition of the invention desirably exhibits a low removal rate when polishing a substrate comprising silicon oxide according to a method of the invention. For example, when polishing silicon wafers comprising silicon oxide in accordance with an embodiment of the invention, such as high density plasma (HDP) oxides and/or plasma-enhanced tetraethyl orthosilicate (PETEOS) and/or tetraethyl orthosilicate (TEOS), the polishing composition desirably exhibits a removal rate of the silicon oxide of about 500 Å/min or lower, for example, about 400 Å/min or lower, about 200 Å/min or lower, about 100 Å/min or lower, about 75 Å/min or lower, about 50 Å/min or lower, or even about 25 Å/min or lower.

The chemical-mechanical polishing composition of the invention desirably exhibits a low removal rate when polishing a substrate comprising polysilicon according to a method of the invention. For example, when polishing silicon wafers comprising polysilicon in accordance with an embodiment of the invention, the polishing composition desirably exhibits a removal rate of polysilicon of about 1,000 Å/min or lower, about 750 Å/min or lower, about 500 Å/min or lower, about 250 Å/min or lower, about 100 Å/min or lower, about 50 Å/min or lower, about 25 Å/min or lower, about 10 Å/min or lower, or even about 5 Å/min or lower.

The chemical-mechanical polishing composition of the invention can be tailored to provide effective polishing at the desired polishing ranges selective to specific thin layer materials, while at the same time minimizing surface imperfections, defects, corrosion, erosion, and the removal of stop layers. The selectivity can be controlled, to some extent, by altering the relative concentrations of the components of the polishing composition. When desirable, the chemical-mechanical polishing composition of the invention can be used to polish a substrate with a silicon nitride to polysilicon polishing selectivity of about 5:1 or higher (e.g., about 10:1 or higher, about 15:1 or higher, about 25:1 or higher, about 50:1 or higher, about 100:1 or higher, or about 150:1 or higher). Also, the chemical-mechanical polishing composition of the invention can be used to polish a substrate with a silicon nitride to silicon oxide polishing selectivity of about 2:1 or higher (e.g., about 4:1 or higher, or about 6:1 or higher). Certain formulations can exhibit even higher silicon nitride to silicon oxide selectivities, such as about 20:1 or higher, or even about 30:1 or higher.

The chemical-mechanical polishing composition and method of the invention are particularly suited for use in conjunction with a chemical-mechanical polishing apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving the substrate relative to the surface of the polishing pad. The polishing of the substrate takes place by the substrate being placed in contact with the polishing pad and the polishing composition of the invention, and then the polishing pad moving relative to the substrate, so as to abrade at least a portion of the substrate to polish the substrate.

A substrate can be polished with the chemical-mechanical polishing composition using any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof. Soft polyurethane polishing pads are particularly useful in conjunction with the inventive polishing method. Typical pads include but are not limited to SURFIN™ 000, SURFIN™ SSW 1, SPM3100 (commercially available from, for example, Eminess Technologies), POLITEX™, and Fujibo POLYPAS™ 27. A particularly preferred polishing pad is the EPIC™ D100 pad commercially available from Cabot Microelectronics.

Desirably, the chemical-mechanical polishing apparatus further comprises an in situ polishing endpoint detection system, many of which are known in the art. Techniques for inspecting and monitoring the polishing process by analyzing light or other radiation reflected from a surface of the substrate being polished are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a substrate being polished enables the determination of the polishing end-point, i.e., the determination of when to terminate the polishing process with respect to a particular substrate.

These following examples further illustrate the invention but, of course, should not be construed as in any way limiting its scope.

The following abbreviations are used throughout the Examples: removal rate (RR); tetraethyl orthosilicate (TEOS); silicon nitride (SiN); polysilicon (polySi); molecular weight (MW); and polyethylene glycol (PEG).

In the following examples, substrates, TEOS silicon oxide (prepared from tetraethoxysilane) coated on silicon, HDP (high density plasma) silicon oxide coated on silicon, polysilicon coated on silicon, silicon nitride coated on silicon, and patterned wafers obtained from Silyb Inc. were polished using either a MIRRA™ (Applied Materials, Inc.) or an AP-300™ tool (CTS Co., Ltd.). The patterned wafers comprised 100 µm silicon nitride features on silicon oxide-coated substrates. An IC1010™ polishing pad (Rohm and Haas Electronic Materials) was used with identical polishing parameters for all compositions. Standard Mirra polishing parameters are as follows: IC1010™ pad, downforce=20.7 kPa (3 psi) or 13.8 kPa (2 psi), headspeed=85 rpm, platen speed=100 rpm, total flow rate=150 mL/min. Removal rates were calculated by measuring the film thickness, using spectroscopic elipsometry, and subtracting the final thickness from the initial thickness.

EXAMPLE 1

This example demonstrates the effect of a cationic polymer comprising quaternary amino groups on silicon oxide removal rate versus silicon nitride and polysilicon removal rates.

Separate substrates comprising TEOS-coated silicon, silicon nitride-coated silicon, and polysilicon-coated silicon were polished with 7 different polishing compositions, Polishing Compositions 1A-1G. The substrates were polished on a CTS polishing tool having a 300 mm platen using an IC1010™ pad at 20.7 kPa downforce. Each of the polishing compositions contained 0.4 wt. % wet-process ceria and 320 ppm of ammonium nitrate at a pH of 4.3. Each of the polishing compositions further comprised one or more of polyMADQUAT (poly(methacryloxyethyltrimethylammonium) chloride), PolyQuat-2 (quaternized [bis(2-chloroethyl) ether-alt-1,3-bis[3-(dimethylamino)propyl]urea]), and polyDADMAC (poly(diallyldimethylammonium) chloride) in amounts as shown in Table 1.

Following polishing, the removal rates for TEOS, silicon nitride, and polysilicon were determined. The results are set forth in Table 1.

TABLE 1

| Polishing Composition | Poly-MAD-QUAT | Poly-Quat-2 | Poly-DAD-MAC | TEOS RR (Å/min) | SiN RR (Å/min) | PolySi RR (Å/min) |
|---|---|---|---|---|---|---|
| 1A | 50 | 0 | 0 | 5626 | 1770 | 2436 |
| 1B | 25 | 25 | 0 | 294 | 1560 | 2871 |
| 1C | 0 | 50 | 0 | 200 | 1184 | 3172 |
| 1D | 50 | 50 | 0 | 198 | 1298 | 3190 |
| 1E | 25 | 0 | 25 | 224 | 1614 | 3256 |
| 1F | 0 | 0 | 50 | 176 | 914 | 3566 |
| 1G | 50 | 0 | 50 | 186 | 784 | 3356 |

As is apparent from the results set forth in Table 1, Polishing Composition 1A, which contained 50 ppm of polyMADQUAT, exhibited the highest silicon nitride removal rate and a silicon nitride to TEOS selectivity of approximately 0.31:1. Polishing Compositions 1B-1G, which contained combinations of polyMADQUAT and PolyQuat-2 (Polishing Compositions 1B and 1D), combinations of polyMADQUAT and polyDADMAC (Polishing Compositions 1E and 1G), PolyQuat-2 alone (Polishing Composition 1C), and polyDADMAC alone (Polishing Composition 1F) exhibited silicon nitride to TEOS selectivities ranging from approximately 4.2:1 to 7.2:1. All of Polishing Compositions 1A-1G exhibited silicon nitride to polysilicon selectivities ranging from approximately 0.23:1 (Polishing Composition 1G) to 0.73:1 (Polishing Composition 1A). The high TEOS removal rate observed for Polishing Composition 1A is believed to be anomalous and resulting from high linear polishing surface speeds near the edge of the 300 mm CTS polishing tool.

EXAMPLE 2

This example demonstrates the effect of a cationic polymer comprising quaternary amino groups and a non-fluorinated nonionic surfactant on silicon nitride, silicon oxide, and polysilicon removal rates.

Separate substrates comprising TEOS-coated silicon, silicon nitride-coated silicon, and polysilicon-coated silicon were polished with 7 different polishing compositions, Polishing Compositions 2A-2G. The substrates were polished on a Mirra tool having a 200 mm platen using an IC1010™ pad at 13.8 kPa downforce. Polishing Composition 2A (comparative) contained 0.4 wt. % wet-process ceria and 50 ppm of polyMADQUAT. Polishing Composition 2B (comparative) contained 0.4 wt. % wet-process ceria, 25 ppm of polyMADQUAT, and 25 ppm of PolyQuat-2. Neither Polishing Composition 2A or 2B contained a non-fluorinated nonionic surfactant. Each of Polishing Compositions 2C-2G contained 0.2 wt. % wet-process ceria having an average particle size of 110 nm and 0.2 wt. % of wet-process ceria having an average particle size of 50 nm, 25 ppm of polyMADQUAT, 25 ppm of PolyQuat-2, and 60 ppm of acetic acid. Polishing Compositions 2C and 2E-2G further contained 400 ppm of potassium nitrate. All of the polishing compositions were adjusted to pH 5.3 with either nitric acid or ammonium hydroxide. Polishing Compositions 2B and 2D (invention) further contained Pluronic™ L31. Polishing Composition 2E (invention) further contained Pluronic™ L31 and a polyvinyl alcohol. Polishing Composition 2F (invention) further contained Pluronic™ L31 and Pluronic™ P123. Polishing Composition 2G (invention) further contained Pluronic™ P123 and Brij 58.

Following polishing, the removal rates for TEOS, silicon nitride, and polysilicon were determined, and the SiN/TEOS and SiN/polySi selectivities were calculated. The results are set forth in Table 2.

TABLE 2

| Polishing Composition | Nonionic Surfactant | TEOS RR (Å/min) | SiN RR (Å/min) | PolySi RR (Å/min) | SiN/TEOS | SiN/PolySi |
|---|---|---|---|---|---|---|
| 2A (comparative) | None | 532 | 1573 | 430 | 3.0 | 3.7 |
| 2B (comparative) | None | 37 | 678 | 409 | 18 | 1.7 |
| 2C (invention) | Pluronic™ L31 | 11 | 881 | 25 | 80 | 35 |
| 2D (invention) | Pluronic™ L31 (no KNO₃) | 168 | 929 | 11 | 5.5 | 84 |
| 2E (invention) | Pluronic™ L31 + polyvinyl alcohol | 43 | 899 | 47 | 21 | 19 |
| 2F (invention) | Pluronic™ L31 + Pluronic™ P123 | 0 | 773 | 31 | >100 | 24 |
| 2G (invention) | Pluronic™ P123 + Brij 58 | 17 | 864 | 34 | 51 | 25 |

As is apparent from the results set forth in Table 2, Polishing Compositions 2C-2G, which further contained non-fluorinated nonionic surfactants, exhibited silicon nitride to polysilicon selectivities ranging from approximately 19.1 to approximately 84.5. Polishing Compositions 2A and 2B, which did not contain a non-fluorinated nonionic surfactant, exhibited silicon nitride to polysilicon selectivities of approximately 3.7 and 1.7. Polishing Composition 2F, which further contained a combination of Pluronic™ L31 and Pluronic™ P123, exhibited a substantially zero removal rate for TEOS.

EXAMPLE 3

This example demonstrates the colloidal stability of polishing compositions in accordance with an embodiment of the invention.

Six polishing compositions were prepared, Polishing Compositions 3A-3F. Polishing Compositions 3A, 3B, and 3D-3F contained 1.2 wt. % of wet-process ceria, which represents a three-fold concentration of the amount of ceria intended at the point-of-use. Polishing Composition 3C contains 1.6 wt. % of wet-process ceria, which represents a four-fold concentration of the amount of ceria intended at the point-of-use. Polishing Composition 3A (comparative) further contained 156 ppm of polyvinylimidazole (PVI) and triethanolamine (TEA) as a buffering agent. Polishing Compositions 3B-3F further contained polyDADMAC and glycine or valine as a buffering agent. The composition of the polishing compositions and their pH values are set forth in Table 3. After preparation, the polishing compositions were allowed to stand and then observed for evidence of settling.

TABLE 3

| Polishing Composition | Concentrate Level | Cationic Polymer | Buffering Agent | pH | Stability |
|---|---|---|---|---|---|
| 3A (comparative) | 3× | 156 ppm PVI | TEA | 7 | Unstable - settled |
| 3B (invention) | 3× | 156 ppm polyDADMAC | Glycine | 7 | Stable - did not settle |
| 3C (invention) | 4× | 208 ppm polyDADMAC | Glycine | 7 | Stable - did not settle |
| 3D (invention) | 3× | 30 ppm polyDADMAC | Valine | 7 | Stable - did not settle |
| 3E (invention) | 3× | 90 ppm polyDADMAC | Valine | 5.3 | Stable - did not settle |
| 3F (invention) | 3× | 90 ppm polyDADMAC | Valine | 4.3 | Stable - did not settle |

As is apparent from the results set forth in Table 3, Polishing Composition 3A, which contained a cationic polymer that does not comprise quaternary amino groups and did not contain an amino acid, was unstable at a concentration three times that at the point-of-use. Polishing Compositions 3B-3F, which contained a cationic polymer that comprises quaternary amino groups and contained amino acids, exhibited stabilities at concentrations that were three times and four times those at the point-of-use at pH values ranging from 4.3 to 7.

EXAMPLE 4

This example demonstrates the effect of a combination of a fluorinated nonionic surfactant and a non-fluorinated nonionic surfactant on silicon nitride, silicon oxide, and polysilicon removal rates.

Separate substrates comprising TEOS-coated silicon, silicon nitride-coated silicon, and polysilicon-coated silicon were polished with 4 different polishing compositions, Polishing Compositions 4A-4D. The substrates were polished on a Mirra tool having a 200 mm platen using an IC1010™ pad at 20.7 kPa downforce. Each of the polishing compositions contained 0.4 wt. % of wet-process ceria in water. Polishing Composition 4A (comparative) further contained 50 ppm of polyMADQUAT and ammonium nitrate at a pH of 4.3. Polishing Composition 4B (invention) further contained 15 ppm of polyDADMAC, glycine, Pluronic L13 (i.e., a non-fluorinated nonionic surfactant), and Capstone FS3100 (i.e., a fluorinated nonionic surfactant) at a pH of 5.3. Polishing Composition 4C (invention) further contained 25 ppm of polyDADMAC, glycine, Pluronic L13 (i.e., a non-fluorinated nonionic surfactant), and Capstone FS3100 (i.e., a fluorinated nonionic surfactant) at a pH of 3.3. Polishing Composition 4D (invention) further contained 25 ppm of polyDADMAC, glycine, Pluronic L13 (i.e., a non-fluorinated nonionic surfactant), Capstone FS3100 (i.e., a fluorinated nonionic surfactant), and OKS 1009 (i.e., a polyvinyl alcohol) at a pH of 4.3.

Following polishing, the removal rates for TEOS, silicon nitride, and polysilicon were determined. The results are set forth in Table 4.

TABLE 4

| Polishing Composition | Cationic Polymer | Buffer/Salt | Surfactant | pH | SiN RR (Å/min) | TEOS RR (Å/min) | PolySi RR (Å/min) |
|---|---|---|---|---|---|---|---|
| 4A (comparative) | 50 ppm poly-MADQUAT | Ammonium Nitrate | None | 4.3 | 1573 | 532 | 430 |
| 4B (invention) | 15 ppm poly-DADMAC | Glycine | L31 + FS3100 | 5.3 | 821 | 197 | 24 |
| 4C (invention) | 25 ppm poly-DADMAC | Valine | L31 + FS3100 | 4.3 | 416 | 180 | 16 |
| 4D (invention) | 25 ppm poly-DADMAC | Valine | L31 + FS3100 + OKS1009 | 4.3 | 542 | 61 | 3 |

As is apparent from the results set forth in Table 4, Polishing Composition 4A exhibited an approximately 3.0:1 selectivity for silicon nitride to silicon oxide, and an approximately 3.7:1 selectivity for silicon nitride to polysilicon. Polishing Composition 4B exhibited an approximately 4.2:1 selectivity for silicon nitride to silicon oxide, and an approximately 34:1 selectivity for silicon nitride to polysilicon. Polishing Composition 4C exhibited an approximately 2.3:1 selectivity for silicon nitride to silicon oxide, and an approximately 26:1 selectivity for silicon nitride to polysilicon. Polishing Composition 4D exhibited an approximately 8.9:1 selectivity for silicon nitride to silicon oxide, and an approximately 181:1 selectivity for silicon nitride to polysilicon.

EXAMPLE 5

This example demonstrates the effect of a combination of a fluorinated nonionic surfactant and a non-fluorinated nonionic surfactant on silicon nitride, silicon oxide, and polysilicon removal rates.

Separate substrates comprising TEOS-coated silicon, silicon nitride-coated silicon, and polysilicon-coated silicon were polished with 4 different polishing compositions, Polishing Compositions 5A-5D. The substrates were polished on a Mirra tool having a 200 mm platen using an IC1010™ pad at 20.7 kPa downforce. Each of the polishing compositions contained 0.4 wt. % of wet-process ceria, polyDADMAC, and valine in water at a pH of 7. Polishing Compositions 5A-5C contained 40 ppm of polyDADMAC, and Polishing Composition 5D contained 48 ppm of polyDADMAC. Polishing Composition 5A (comparative) did not further contain a nonionic surfactant. Polishing Composition 5B (invention) further contained Pluronic P123 (i.e., a non-fluorinated nonionic surfactant). Polishing Composition 5C (invention) further contained Pluronic P123 (i.e., a non-fluorinated nonionic surfactant) and Brij 58 (i.e., a non-fluorinated nonionic surfactant). Polishing Composition 5D (invention) further contained Brij 58 (i.e., a non-fluorinated nonionic surfactant) and Capstone FS 3100 (i.e., a fluorinated nonionic surfactant).

Following polishing, the removal rates for TEOS, silicon nitride, and polysilicon were determined. The results are set forth in Table 5.

TABLE 5

| Polishing Compostion | Poly-DADMAC (ppm) | Nonionic Surfactant | SiN RR (Å/min) | TEOS RR (Å/min) | PolySi RR (Å/min) |
|---|---|---|---|---|---|
| 5A (comparative) | 40 | None | 290 | 119 | 268 |
| 5B (invention) | 40 | Pluronic P123 | 832 | 115 | 14 |
| 5C (invention) | 40 | Pluronic P123 + Brij 58 | 730 | 115 | 14 |
| 5D (invention) | 48 | Brij 58 + Capstone FS 3100 | 534 | 117 | 23 |

As is apparent from the results set forth in Table 5, Polishing Composition 5A exhibited an approximately 2.4:1 selectivity for silicon nitride to silicon oxide, and an approximately 1.1:1 selectivity for silicon nitride to polysilicon. Polishing Composition 5B exhibited an approximately 7.2:1 selectivity for silicon nitride to silicon oxide, and an approximately 59:1 selectivity for silicon nitride to polysilicon. Polishing Composition 5C exhibited an approximately 6.4:1 selectivity for silicon nitride to silicon oxide, and an approximately 52:1 selectivity for silicon nitride to polysilicon. Polishing Composition 5D exhibited an approximately 4.6:1 selectivity for silicon nitride to silicon oxide, and an approximately 23:1 selectivity for silicon nitride to polysilicon.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition comprising:
   (a) about 0.01 wt. % to about 1 wt. % of wet-process ceria,
   (b) about 10 ppm to about 200 ppm of a cationic polymer comprising quaternary amino groups,
   (c) about 10 ppm to about 2000 ppm of a non-fluorinated nonionic surfactant,
   (d) an amino acid, and
   (e) water,
wherein the polishing composition has a pH of about 3 to about 8.

2. The polishing composition of claim 1, wherein the wet-process ceria comprises a mixture of a first ceria having an average particle size of about 10 nm to about 60 nm and a second ceria having an average particle size of about 60 nm to about 150 nm.

3. The polishing composition of claim 1, wherein the cationic polymer comprises diallyl dimethyl ammonium monomer units.

4. The polishing composition of claim 1, wherein the cationic polymer comprises methacryloxyethyltrimethylammonium monomer units, N,N-dimethyl-2-hydroxypropylammonium monomer units, (3-methyl-1-vinylimidazolium chloride) units, quaternized [bis(2-chloroethyl) ether-alt-1,3-bis[3-(dimethylamino)propyl]urea] units, quaternized anhydroglucose units, or a combination thereof.

5. The polishing composition of claim 1, wherein the non-fluorinated nonionic surfactant is a polyoxyethylene-polyoxypropylene block copolymer, or a polyethylene glycol alkyl ether.

6. The polishing composition of claim 5, wherein the non-fluorinated nonionic surfactant has an average molecular weight from about 500 Daltons to about 2000 Daltons.

7. The polishing composition of claim 1, wherein the amino acid is glycine, alanine, or valine, or a combination thereof.

8. The polishing composition of claim 1, wherein the polishing composition further comprises a fluorinated nonionic surfactant.

9. The polishing composition of claim 1, wherein the polishing composition further comprises about 1 ppm to about 500 ppm of a polyvinyl alcohol.

10. The polishing composition of claim 1, wherein the polishing composition has a pH from about 4 to about 7.

11. A method of chemically mechanically polishing a substrate comprising:
(i) contacting a substrate with a polishing pad and a chemical-mechanical polishing composition comprising:
(a) about 0.01 wt. % to about 1 wt. % of wet-process ceria,
(b) about 10 ppm to about 200 ppm of a cationic polymer comprising quaternary amino groups,
(c) about 10 ppm to about 2000 ppm of a non-fluorinated nonionic surfactant,
(d) an amino acid, and
(e) water, wherein the polishing composition has a pH of about 3 to about 8,
(ii) moving the polishing pad and the chemical mechanical polishing composition relative to the substrate, and
(iii) abrading at least a portion of the substrate to polish the substrate.

12. The method of claim 11, wherein the wet-process ceria comprises a mixture of a first ceria having an average particle size of about 10 nm to about 60 nm and a second ceria having an average particle size of about 60 nm to about 150 nm.

13. The method of claim 11, wherein the cationic polymer comprises diallyl dimethyl ammonium monomer units.

14. The method of claim 11, wherein the cationic polymer comprises methacryloxyethyltrimethylammonium monomer units, N,N-dimethyl-2-hydroxypropylammonium monomer units, (3-methyl-1-vinylimidazolium chloride) units, quaternized [bis(2-chloroethyl) ether-alt-1,3-bis[3-(dimethylamino)propyl]urea]units, quaternized anhydroglucose units.

15. The method of claim 11, wherein the non-fluorinated nonionic surfactant is a polyoxyethylene-polyoxypropylene block copolymer, or a polyethylene glycol alkyl ether.

16. The method of claim 15, wherein the non-fluorinated nonionic surfactant has an average molecular weight from about 500 Daltons to about 2000 Daltons.

17. The method of claim 11, wherein the amino acid is glycine, alanine, or valine, or a combination thereof.

18. The method of claim 11, wherein the polishing composition further comprises a fluorinated nonionic surfactant.

19. The polishing composition of claim 11, wherein the polishing composition further comprises about 1 ppm to about 500 ppm of a polyvinyl alcohol.

20. The method of claim 11, wherein the polishing composition has a pH from about 4 to about 7.

21. The method of claim 11, wherein the substrate comprises silicon nitride, and wherein at least a portion of the silicon nitride is abraded to polish the substrate.

22. The method of claim 21, wherein the substrate further comprises silicon oxide, and wherein at least a portion of the silicon oxide is abraded to polish the substrate.

23. The method of claim 22, wherein the substrate further comprises polysilicon, and wherein at least a portion of the polysilicon is abraded to polish the substrate.

* * * * *